United States Patent [19]

Seiden

[11] 4,394,541

[45] Jul. 19, 1983

[54] THREE STAGE MINIMUM CONFIGURATION CONDITIONALLY NON-BLOCKING MATRIX

[76] Inventor: Lewis J. Seiden, 37 Liberty Rd., Tappan, N.Y. 10983

[21] Appl. No.: 222,063

[22] Filed: Jan. 2, 1981

[51] Int. Cl.³ .............................................. H04G 3/42
[52] U.S. Cl. ............................ 179/18 GE; 340/825.79
[58] Field of Search ............... 179/18 GE, 18 GF, 22, 179/18 EA; 340/825.83

[56] References Cited

U.S. PATENT DOCUMENTS

| | | | |
|---|---|---|---|
| 3,129,407 | 4/1964 | Paull | 340/147 |
| 3,358,269 | 12/1967 | Benes | 340/166 |
| 3,454,723 | 7/1969 | Lucas | 179/18 EA |
| 3,541,267 | 11/1970 | Fukutomi | 179/18 EA |
| 3,718,907 | 2/1973 | Altenburger | 179/27 D |
| 3,792,200 | 2/1974 | Altenburger | 179/18 GE |
| 3,823,270 | 7/1974 | Moreno | 179/18 EA |
| 3,906,164 | 9/1975 | Phillip | 179/18 EA |

OTHER PUBLICATIONS

Clos, Charles, "A Study of Non-Blocking Switching Networks", *Bell System Technical Journal*, Mar. 1953, pp. 406–424.
Bowers, T. L., "Blocking in 3-Stage 'Folding' Switching Arrays, IEEE Transactions on Communication Technology", Mar. 1965, pp. 14–37.

*Primary Examiner*—Harold I. Pitts

[57] ABSTRACT

A switching system has N inputs and M outputs and three stages of matrices. The first stage includes n substage matrices, each with x inputs and x outputs where N equal nx. The second stage provides x substage matrices each with n inputs and m outputs, an output from each first substage matrix being connected to an input of each second stage matrix. A third stage employs m substage matrices each with x inputs and x outputs where M=mx, an output from each second stage being connected to an input of each third substage matrix. Switching means are provided at each node of each substage matrix. Means is provided for choosing a proper sequence of switches to reach a selected output to be connected to a selected input.

By the addition of an extra input and output to each substage of the second stage with output to input connections between all substages of that stage, it is possible to connect an input from one substage to an output in another. Such an arrangement in the middle stage of a three stage matrix, known as a mid stage link (MSL) allows conditionally non-blocked re-routing in situations where a substage appears to be blocked.

17 Claims, 6 Drawing Figures

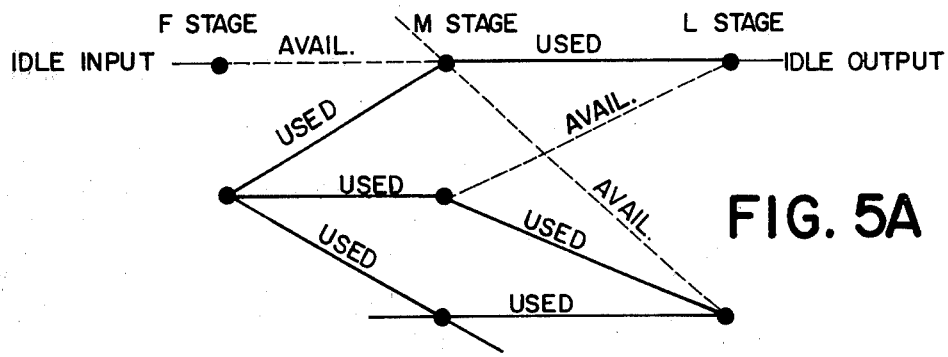
FIG. 5A
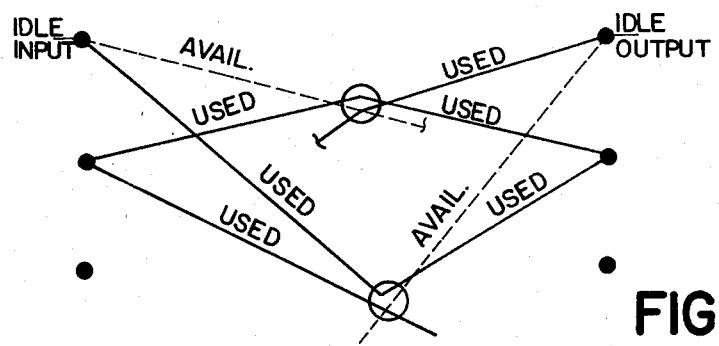
PROBLEM STATEMENT
FIG. 5B
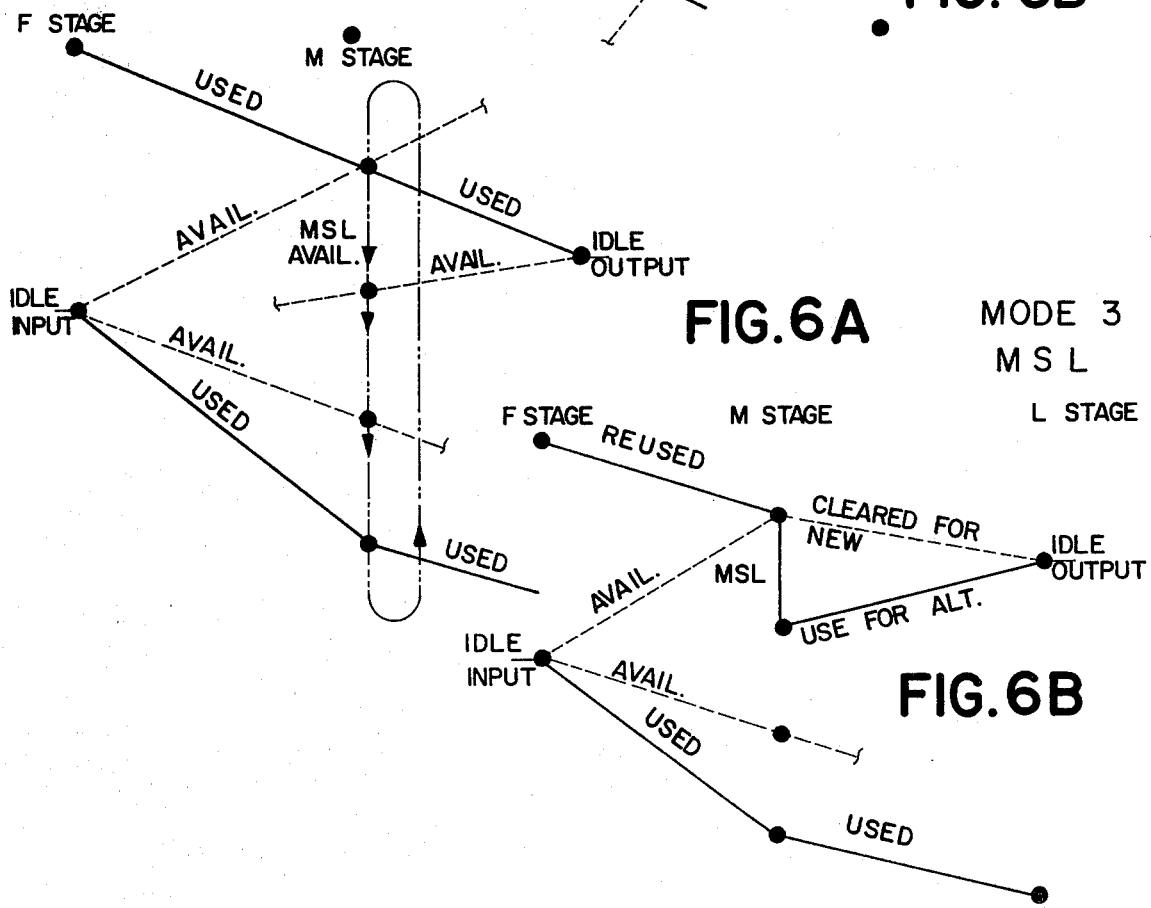
FIG. 6A
MODE 3
M S L
FIG. 6B

THREE STAGE MINIMUM CONFIGURATION CONDITIONALLY NON-BLOCKING MATRIX

The present invention relates to a switching system which employs a number of inputs and a number of outputs and which is capable of greatly reducing the number of switch means required to connect all those inputs, and outputs as compared with a simple single stage matrix capable of connection of any and all inputs and outputs in different combinations. More specifically, the system of the present invention employs a particular configuration of a three stage array with square matrices as the sub-stages of each stage. The matrices can have switches at each matrix node or employ the transfer bus matrix of my contemporaneously filed U.S. application Ser. No. 222,064.

THE PRIOR ART

The use of switching arrays to connect a predetermined number of inputs with a predetermined number of outputs in any combination has become quite a common requirement. The direct approach is to employ a single matrix with N inputs being connected at the input side of the matrix and N outputs being connected at the output side of the matrix. Classically, such a matrix is visualized as a square for ease of discussion, the conductors in an input array overlapping conductors in an output array. Normally open switches at the nodes or cross points in the two arrays interconnect the crossing conductors. It will be appreciated that the number of nodes for such a square array is $N^2$. The number of conductors to be interconnected can be one or more and are usually considered to be the "cross points". As communication problems have become more complex, the number of inputs and outputs has tended to increase substantially and the number of switches for the single square matrix approach, increasing as it does by the square of the number of inputs or outputs, has become unmanageable and extremely expensive. This is particularly so when it is realized that only N of the $N^2$ switches is used to connect every input to one of the outputs along N paths. Therefore, a maximum of only 1/Nth of the equipment is being used.

The present state of the art is to trunk between the inputs and outputs. For example, make an $N \times 1$ input matrix, trunk the 1 over to an output matrix, that is a $1 \times N$ matrix. This combination will allow only one connection to be made, but it eliminates $(N^2 - 2N)$ nodes. When the one path is completed, 1/Nth of the equipment will have been used, but it is 1/Nth of a much smaller number than $N^2$. Of course, only one such connection can be made and continuing to increase the number of busses using this approach quickly defeats the purpose and does not yield better results. That is, if N/2 busses are provided, the input matrix is N by N/2 and the output matrix is the same, giving a total equipment count of $N^2$ (which is the same as the square matrix), but it only allows N/2 connections so that the user is better off using the standard square matrix to make N connection. Notice that after N/2 connections are made, the system is blocked. No additional connection can be made until an old one is cleared. There is no place to put one of the old ones that will clear a possible connection either. Blocking and trunking are therefore chosen at an efficient level.

The problem of minimizing matrix nodes has been considered at length. For example, there was an article by Charles Clos in the Bell System Technical Journal of March 1953, beginning at page 406, entitled "A Study of Non-Blocking Switching Networks". This article, among other things, proposed multi-stage switching arrays, including 3, 5, and 7 stage arrays, requires $6N^{3/2} - 3N$ nodes, and it proceeded to show that, as N increases in size, at some point there will be a crossover where $6N^{3/2} - 3N$ is less than $N^2$.

The problem was later considered by T. L. Bowers in an article entitled "Blocking in 3-Stage 'Folded' Switching Arrays" in the March 1965 issue of the IEEE Transactions on Communication Technology. Bowers considered the problem of blocking in three stage switching arrays, which can have a substantial effect upon the usefulness of such a system.

Patents have also been issued for some multi-stage switching matrices as well, for example: U.S. Pat. No. 3,129,407, dated Apr. 14, 1964, to M. C. Paull for "Switching Network Control System" and U.S. Pat. No. 3,358,269, issued Dec. 12, 1967, to V. E. Benes for "Square Switch Distribution Network Employing a Minimum Number of Cross Points".

THE PRESENT INVENTION REPRESENTS AN ADVANCE IN THE ART

The present invention is directed to a three stage matrix design which has as its basic purpose to insure that there are only just enough through paths in the switching system such that any input can be connected to any output, not already in use, at any time. The system employs three stages of matrices; each stage is made up of substages with each substage matrix being a square matrix. The same number of square matrices of a given size are used in the first and last stages and different number of matrices of a different size may be used in the middle, or intermediate stage. A possible modification within the scope of the invention is to make the middle matrix rectangular and adjust the first and last stage matrices so that their inputs and outputs are not an equal number but numbers to match the input and output of the middle stage.

It should be noted that all odd stage configurations above one can be solved by repetitive three stage solutions, for example, using a previous solution of stages as a new middle stage. Also each segment of even stage configuration problems can be then isolated for three stage solution and treated as a single stage. Therefore, the system of the present invention is useful for all multi-stage matrices.

One method of reducing the number of switches required is to provide matrices which are blocking, such that under certain circumstances connection cannot be made between a given input and output, even though the output has not previously been taken by any other input or is not busy. Blocking can also be considered to be that situation in which certain connections cannot be made until other connections are broken. The present invention permits an apparent blockage, called "conditionally blocked", to be switched to another path to free the blocked path in such a way as to not lose continuity between the original input and output.

THE NATURE OF THE PRESENT INVENTION

More specifically, the present invention relates to a three stage conditionally non-blocking matrix array and a switching system having N inputs and M outputs (preferably where M=N) wherein each input may be connected to any output not busy and every input may simultaneously reach an output. The first stage includes n matrices called substages, each with x inputs and x outputs where N equals nx. The second stage includes x substage matrices each with n inputs and m outputs, an output from each first stage substage matrix being connected to an input of each second stage matrix. The third stage matrix includes m substage matrices each with x inputs and x outputs, where M=mx) an output from each second stage matrix being connected to an input of each third stage matrix. Switch means are provided at each node of each substage matrix. Alternatively, each substage matrix can be provided with a transfer bus matrix as described in my co-pending U.S. application Ser. No. 222,064, filed contemporaneously with this patent application.

Means may also be provided for choosing a proper sequence of switches to reach a selected output to be connected to a selected input. Means are also provided to select a new alternate path to replace an old blocking path before disconnecting the old blocking path to allow the path which was conditionally blocked to be selected.

In particular, the present invention provides means in such a matrix system to avoid apparent blockage by using one or more intrastage links to connect an input in one substage matrix to an output in another substage matrix of the source stage. Usually this is done in the middle stage of a three stage matrix and preferably may be done with extra outputs and inputs connectable by extra switching means to the other inputs and outputs of the same substage matrix. The extra output of one substage is connected to at least one input of another substage matrix and interconnection is afforded by intrastage links between these two substages or as many sequential links as needed.

The invention also provides a method of avoidance apparent blockage using such intrastage links whereby connection is made from an input in one substage matrix to an output in another.

For a better understanding of the present invention, reference is made to the accompanying drawings in which.

FIGS. 5A and 5B represent the problem statement for a blocked situation that cannot be solved by a mode 1 or a mode 2 solution but is a conditionally non-blocking condition avoided by use of the MSL (mode 3); and FIGS. 6A and 6B represent the search procedure and use of an MSL connection in mode 3 to solve the problem of FIGS. 5A and 5B.

Figure 1:
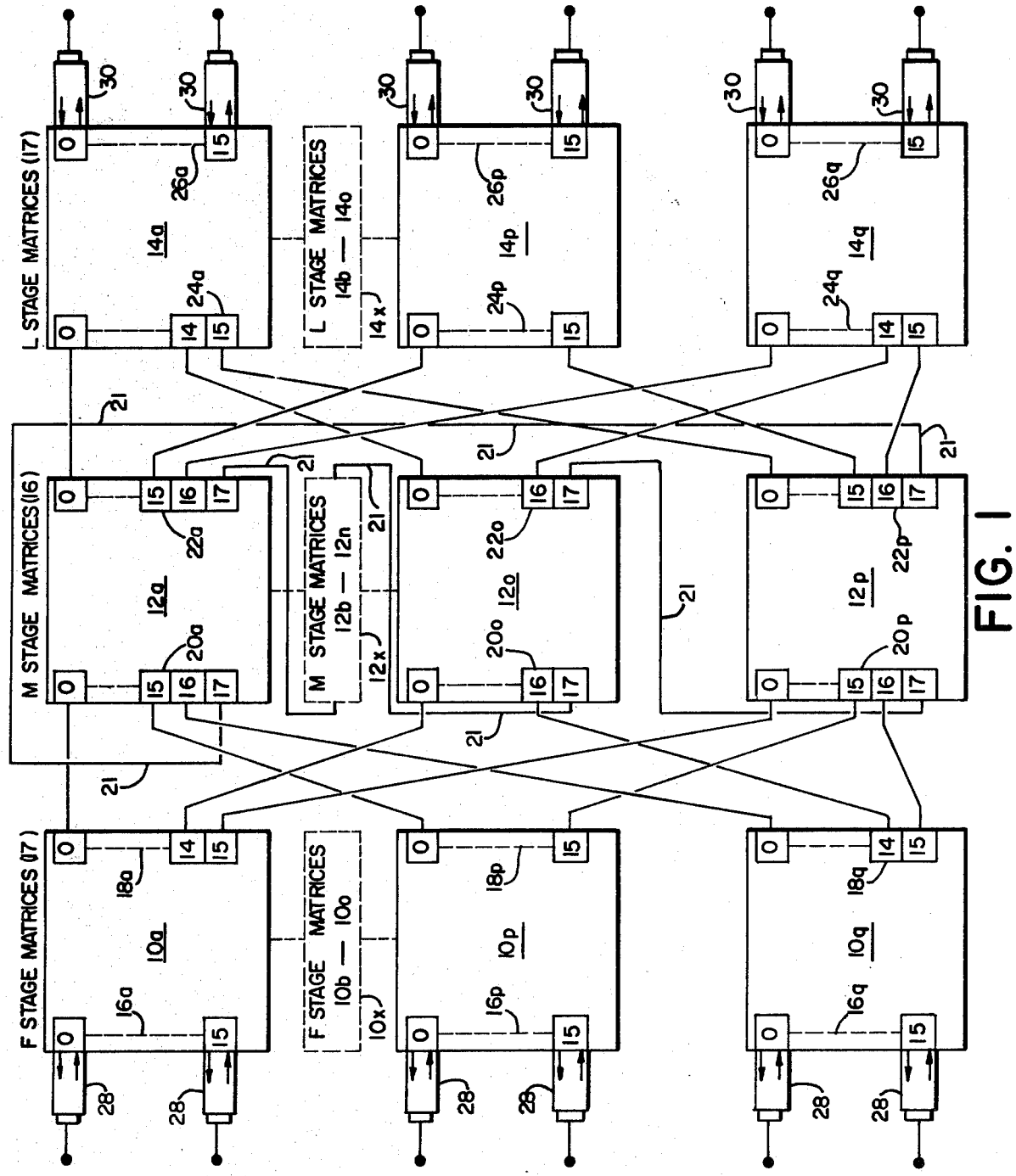
FIG. 1 illustrates a three-stage matrix in accordance with the present invention in a highly schematic representation.

Referring now to FIG. 1, the matrix configuration represented has 272 input ports into the 17 F stage substage matrices (17×16=272) and 272 outputs out of the 17 L stage substage matrices. Thus, in this particular matrix configuration, N is 272. In a single square matrix, which this configuration replaces, there would be 272×272=73,984 nodes. In the drawing only three each of the 17 F stage substage matrices are shown. Matrices 10a, 10p, and 10q are represented by separate boxes while the other 10b-10o are lumped together to save drawing space but will be understood to represent 14 matrices like those shown. There are 16 M stage substage matrices, 12a to 12p, with only stages 12a, 12o, and 12p fully represented. Similarly, there are 17 L stage matrices, 14a to 14g, of which only three matrices 14a, 14p, and 14q are shown. The missing matrices in each of the stages are schematically represented by a single box 10x, 12x and 14x in each stage with the details shown in the other matrix representations omitted. If fully represented, each substage matrix would appear similar to matrices shown in the same column. It will be appreciated that each of the matrices might be schematically represented by a grid of parallel electrical input lines across which parallel output electrical lines extend wherein switch means is provided at each cross-over representative of a node. In this telephone type switching arrangement each line may be representative of a single wire but more likely, alternatively, may be more complex, as in computer applications systems, in which each line may represent, for example, 16 wires, and instead of a single switch, 16 switches are provided at each node. It will be understood that in a practical system, the grid configuration is still theoretically representative, but exact arrangements of the conductors is unimportant provided the switch connections or nodes are provided whereby each of the input ports can be connected to any one of the output ports.

In a given substage such as F stage substage matrix 10p, there are effectively 16 inputs which are connectable to any one of 16 output ports. The 16 input ports are numbered in sequence 0 to 15, as are the output ports 18. The input port arrays for F stage matrices 10a–10q are 16a–16q, respectively, and the output terminal or port arrays are 18a–18q, respectively. M stage substage matrices are similar but have 18 input port arrays 20a through 20p and 18 output port arrays 22a through 22p. Individual input ports of matrix 12a may be identified by 20a-0 through 20a-17, for example. It should be noted in passing that ports 17, both in the input and output arrays of each M stage substage, are not part of the conventional matrix but provide the midstage link (MSL) 21. Finally, L stage substage matrices have input port arrays 24a–24q and output port arrays 26a–26q.

Each output port of the array 18 of each F stage substage matrix is hard wire connected to an input port of the arrays 20 of a different M stage substage matrix. Similarly, each output port of array 22 of each M stage substage matrix is hard wire connected to an input port of the arrays 24 of a different L stage substage matrix. These connections are hardwired so that no switching is involved between them, although they may be disconnected. On the other hand, each input port 16 of the F stage substage matrices and each output port 26 of the L stage substage matrices is provided with a cable connector 28 and 30, respectively. In a preferred embodiment, these cable connectors connect 16 wires having a division of 6 wires carrying signal in one direction and 10 in the other direction. The switching means at each substage matrix node consists of a relay providing 16 switches. These relays are preferably remotely controlled and may be controlled, for example, by manual apparatus such as shown in U.S. Pat. No. 4,048,672 or automatically by means including transfer bus matrices disclosed in my co-pending U.S. patent application Ser. No. 222,064, filed simultaneously herewith.

The effect of the cross-connection is that combination of lines applied to a connector 28 at any input port 16a, for example, may be connected through the system to any output port connector 30 using the matrix connection.

The links 21 which connect the output ports 22 of the middle stage substages to the input ports 20 of the next and the last back to the first, in the embodiment shown, successive middle stage substages, constitute the mid stage links (MSL). In alternative arrangements they could also connect any midstage substage to any other midstage substage if the control system were informed of the connection and program logic provided. Their function will be detailed later.

PLACEMENT REQUEST CONNECTION CRITERIA

At some point in the use of a matrix switching system after sufficient inputs have been connected to select outputs the problem of finding an unblocked path between a selected idle input and a selected idle output is subject to risk of apparent blockage. In accordance with the present invention, when this apparently blocked condition arises, a strategy is provided for finding a path between the input and output terminals desired to be connected.

The purpose of this strategy is to create a path from a randomly desired input to a randomly desired output required randomly in time when none appears to exit. One of the criteria essential to proceeding is that no existing connection be broken before a substitute is established in order to satisfy the needs of the new path. For this reason, the present invention recognizes, possibly for the first time, a condition known as "conditionally-blocked", further defined as an apparently blocked new path condition, which can be satisfied by rearrangeability. In accordance with the strategy of the present invention, the existing network is modified such that a New Alternate Path (NAP) is created for an Old Blocking Path (OBP), such that both paths exist at the same time and in the same space before the OBP is disconnected. The action may require more than one step, during which various OBPs may be replaced. If what appears to be a conditionally-blocked condition proves not to be conditionally blocked, then the network is actually blocked. Actual blocking is that condition wherein for example a "closed-set" of paths exists which form a self-defeating set such that all potentially possible NAPs would require use of links already used in other OBP's. Thus, rearrangeability as defined in this invention is blocked.

In this case the midstage links (MSL) 21 are used to provide the connection between a blocked route from an M substage and the blocked route to a M substage. This is possible because exactly enough links are provided between F and M stages for the number of paths and exactly enough links are provided between M and L stages for the number of paths. The MSL allow the links that exist to be used to interconnect the input to the output. The midstage links are connected between an extra output (each output in array 22a–22p) numbered 17 in each of the M stage substage matrices and an extra input in each input array 20a–20p numbered 17 in said M stage substage matrices. The output 17 of one M stage outstage matrix conveniently may be connected to the input of the next adjacent matrix until the output of the last is connected back to the input of the first. If this configuration is used, the substage which appears to be blocked is connected to the next substage matrix, and the next, etc., until one providing no blocked condition is found. Alternatively, the route could be in a random (but known) order through the midstage substage.

If the entire desired connection plan were not random, but known before any connection was made, it would be entirely possible to define the connections, rearranging any potentially interfering connections in a planned set-up before any actual path were connected. In practice, however, use is random and cannot be predicted. The entire problem is, therefore, devoted to satisfying sequentially occurring path requests, and making adjustments in earlier selected paths to satisfy as many requests as possible.

The configuration of the present invention is such that there is to be no connection across F to L stages but all connections must go through the M stage. Moreover, as to connections between F and M and between M and L stages there is only one link between any substage of any stage, to any substage of any other stage. An important operational feature to remember is that before any connections are made, there are as many choices of paths capable of being made for each path required as there are substages in the M stage.

The procedure resolves itself into different modes depending on the conditions encountered when a given connection is to be made. Mode O is used when there are ample paths from which selection can be made. When paths cannot be readily formed, mode 1 is adopted which involves a simple rearrangement. A second level rearrangeability may involve multiple rearrangement in a mode 2 situation. The use of MSL is called mode 3. Each mode will now be considered in greater detail.

Mode O

Figure 2:
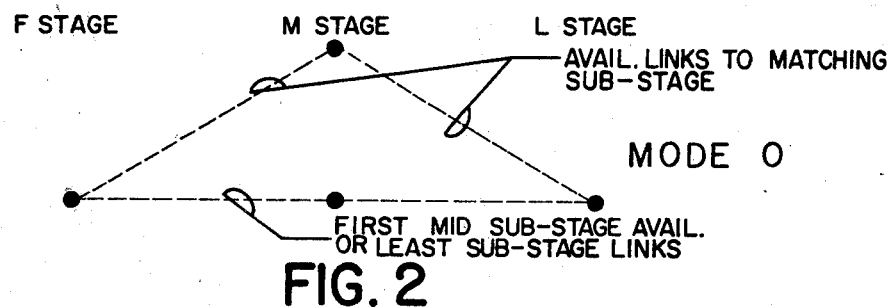
FIG. 2 illustrates the path selection logic (mode 0) until a conditionally blocked condition exists.

Mode O, illustrated in FIG. 2 is the beginning of path construction. The simplest and most straightforward strategy is to sequentially determine from the first to the highest number, the M substage that can support a path from the input to the output. Alternate strategies are possible, of course, but need not be considered. At some point during the network connection plan, the best selection for reducing interference occurs as a result of a selection that is based on utilizing the M substage that has the least number of links. Note that until the midstage links (MSL) are used, the number of links between a first and M stage is equal to the number of links between a M and L stage, and therefore the count of either is equal. The philosophy behind this criteria is that as less links become available, it is wiser to use them in paths that they can be used in as soon as possible. The activation of this selection strategy has, therefore, been variously tried at half the total number of paths, two-thirds the number of paths, and with less than two times the number of M substages left to be made.

Another possible strategy is the determination that when only one path remains to be made of a closed-set, it is desired to prevent the formation of this closed-set by use of a conditionally blocked type of rearrangement, even though a conditionally blocked condition does not yet exist. It has been found that the strategy defers the formation of the closed-set, leaving the MSL for later use in the connection plan.

The purpose of all these strategies is to create as many paths as possible before calling upon the MSL to solve blockage problems. Again, the call routing strategies cannot prevent the need for the MSL under some randomly approached circumstances.

Mode 1

Figure 3A:
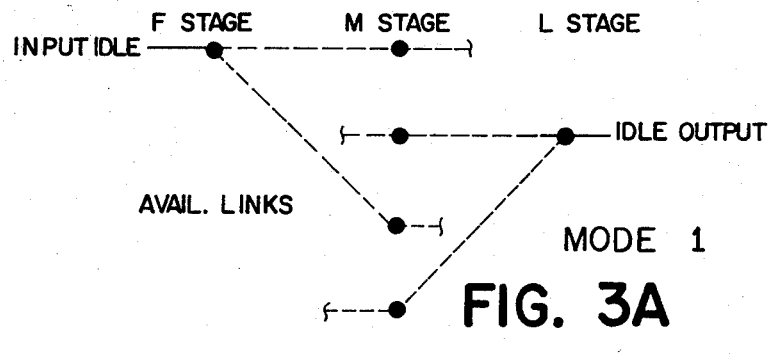
FIG. 3A illustrates the available links of a possible conditionally blocked condition (mode 1)
Figure 3B:
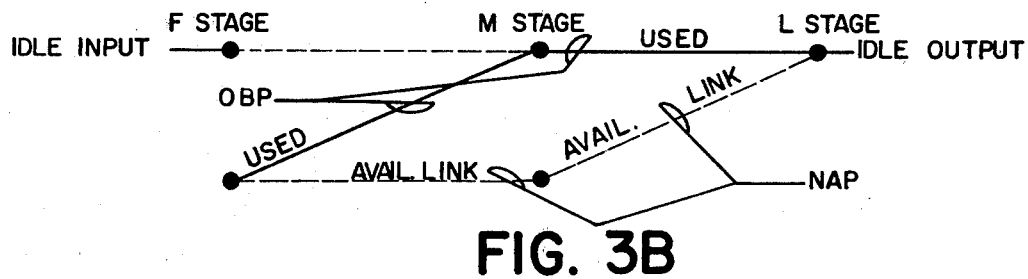
FIG. 3B shows the conditionally blocked condition (mode 1) of an old blocking path (OBP) and the new alternate path (NAP)

Mode 1 is employed upon the detection of an apparent blockage, the condition illustrated in FIG. 3A. Note that available links exist but do not reach matching M stage substages. In this mode alternate routes for existing paths are ascertained. If one is found, as is suggested in FIG. 3B, it is a solution to the problem. The criteria of search is to find first the available links of the problem and then to find an OBP. If that OBP has an NAP that connects to one of the available links from either the first substage or the last substage involved in the connection for the new path, then the blockage condition that was detected is only a conditionally-blocked case. The NAP is set up and then the OBP is broken. Then one of the links that was cleared from the OBP is used with an available link to form the new path.

Note as an aside that the conditionally-blocked condition implies that another new path requirement might have slipped in before the present new path requirement that would not have required a move. This particular other new path could, therefore, have formed a closed-set which would have blocked some particular future move. It is desirable to allow a Model 1 type of operation for as long as possible into the connection plan, but the criteria that will permit this have yet to be fully determined.

For each available link, in Mode 1, there is one, and only one, OBP that must be inspected. This is evident from FIG. 3B, since there is only one link from the proposed M substage to one of the L stages for the new path. This means that as a minimum mode 1 requires investigation of two OBP, one for each available link. If none of the NAP's exists to clear an OBP, there is still no guarantee that the system is blocked. It may be capable of being cleared by Mode 2 operation.

Mode 2

Figure 4:
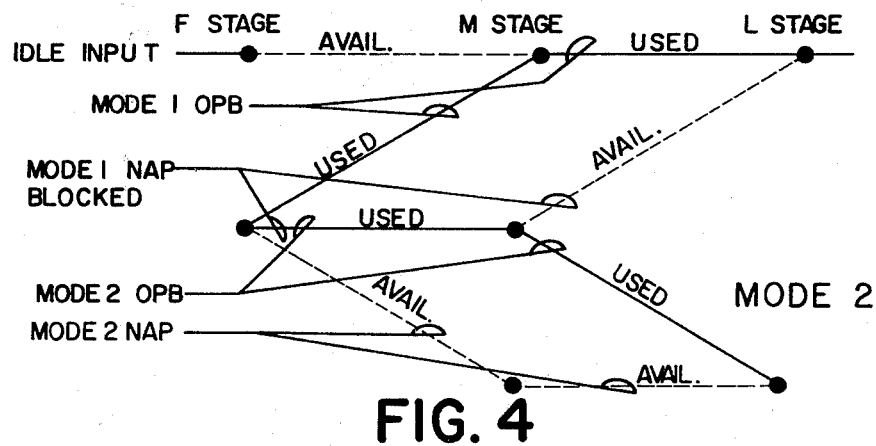
FIG. 4 shows a two step process (mode 2) for rearranging paths to clear conditional blocking.

Mode 2 is illustrated in FIG. 4. The simplest way of looking at Mode 2 operations is to say that it is a Mode 1 type of operation for every OBP found in Mode 1. For example, in FIG. 4 the NAP to solve the Mode 1 problem is blocked, but that the blocking path can be moved.

In the initial investigation a random search was made for any old path associated with M substages of the new path problem. This makes for more trial and error, and is acceptable, but not desirable. But, in an attempt to refine and simplify the controls, the Mode 2 alternate approach of determining feasibility of a solution was conceived.

In either case the purpose of a Mode 2 is to make some NAP that will allow an OBP to be cleared to allow an NAP of a Mode 1 type of OBP to be moved.

In FIG. 4 (which will be understood to be highly schematic and simplified) the criteria of selection and availability of an alternate path move does not show why such a move cannot be made. It is fundamental that a closed-set would cause such a blockage. However, it has not yet been ascertained whether any other condition could also cause such a blockage.

Mode 3

When a closed-set condition occurs, not only can there be no new alternate path in the Mode 1 investigation, but a blocking path for the new path is also a blocking path for an old path. It is easy to show that such closed-sets can be formed. That such closed-sets can be prevented by making moves before they are necessary can also be shown. That such moves do not form future potential closed-sets for the same future input is also verifiable. It has been found, in fact, that the movement does not even create a potential closed-set for any other possible new path requirement.

What has not been verified is that the move required to prevent the formation of a closed-set might conceivably move some path into an alignment that might form a closed-set or a future blockage with some other group of paths not included in the original problem. Since a closed-set is formed by a number of paths equal to two times the number of M substages, it would appear to be impossible not to create such a situation when less than that number of paths remain to be made. In such a case, all possible potentially closed-sets must have been formed, although they may not interfere.

A type of closed-set has as its core that the paths that form it form a complete set from an F substage and also to some L substage. Note that blockage does not always require either a closed set, or a closed set formed by 1 or 2 complete sets.

A complete set means that no other links are available from (or to) a substage, but since all links are used there cannot be any idle ports on that substage. A closed-set can include two complete sets: one on a first-substage and the other on a last-substage. Further, each complete set has to include a path to the substage that has the idle port. Note that, if a complete set is not involved in possible alternate paths for future new paths, the complete, or even the closed set, does nothing to interfere with new path selection. As an example, if the entire F substage 10c were connected via all known M substages to L substage 14f, even though these were complete sets in the F and L substages and a closed set of new paths which prevented any alternate path connections, this does not form a blocked-condition, since no new paths are required to either that F or L substage and that the links used in those paths are not needed for any movement of paths.

The problem that is found in Mode 2 and defined as the problem to be solved in Mode 3 is shown in FIGS. 5A and 5B. The typical problems as illustrated in FIG. 5A shows how a new path being blocked looks to a Mode 1 solution which is blocked, and then as further illustrated in FIG. 5B how a new path being blocked looks to a Mode 2 solution which, in turn, is blocked, because not only are the links used but are needed in a fashion that is mutually exclusive. Since the typical problem diagram cannot show all the other possibilities being ruled out, only the specific problem of a closed-set is shown for the limited case of two M substages in FIG. 5B specifically. Note that there is a complete set in both an F and an L substage. Note further that two complete sets are involved in the paths to the substages which require interconnection for the idle input to idle output path. Note also that for this specific problem, no amount of Mode 2 movement is possible. Therefore, the solution must involve the MSL.

FIGS. 6A and 6B show how the solution to the problem is approached. The set up shown is for a different case than was shown in the problem case, but the situation in all such cases is that a mid-stage linkage (MSL) 21 is needed to overcome blockage. A mid-stage linkage is a connection which is made from one substage matrix to another in the M stage. The MSL could be used either for the new path or for one of the existing paths to clear a link for use on a new path. Much remains to be learned to determine which yields the greatest simplicity. It appears that use in the new path will be simplier; however, the more complicated old path use will be discussed.

First, an OBP whose link is needed for the new path is found. This involves alternative sensing to determing what is available. It is known that since this OBP is involved in a substage which has an idle port there must be an available link from that substage. The old path that uses the least number of midstage links is then chosen (since midstage links are polarized and go from lower numbered substages to increasing number substages in the preferred embodiment). The OBP is then substituted for by an NAP that utilizes the least number of MSL's and then the link that it frees is able to be used in the new path. Notice that the remaining links allow as a minimum another connection from the used M substage back around again, to the used input M substage. In this way one (1) set of MSL allows as a minimum two usages, but it also allows individual connections on a one connection per link basis if the system requires it.

The final strategy for the MSL is to choose either the new path or the movement of an OBP based on the shortest link run required to conserve the MSL for as long as possible.

At some future time in the operation of the matrix, certain connections may be broken. Those broken connections may allow the MSL to go back to a normal nondisjoint path connection. A housekeeping program has been set up to analyze the system after any disconnect or movement to ascertain that an MSL can be cleared. In simulation studies performed, the MSL housekeeping program has operated based only on additional paths moving other old paths. Other possibilities may exist.

MINIMUM CONFIGURATION THREE STAGE MATRIX

The minimum three-stage matrix will now be compared to the various size matrices created from the Clos article and then further analyzed by others. In order to keep this comparison principle usable, no graph theory or set theory will be used, although it will be understood that such techniques can be used in analysis. However, herein the math will be limited to algebra for the purpose of comparing sizes for economies; and calculus for determining minimum size configurations.

STAGES

Since even number stage (zero (triangular), 2, 4, etc.) matrices serve a different function than the cross connect function supplied by odd number matrices, they will not be covered here, but as already noted each individual stage could be solved by the solution specified.

A one-stage matrix is completely unblocked interconnect whose nodes are equal to the product of the input and output requirements, and whose ports are equal to the sum of the input and output requirements, and whose interconnectability is universal and covers all possible types of connecting requirements. The one stage matrix is used as the standard of comparison for all of the various solutions. Matrices can be used to connect any input port to any, but only one output port; or to any or all output ports. The usual analysis is done on the one and only one, to one and only one, connectability basis, which is the area of greatest interest in connection with the present invention. The other condition of broadcasting or conferencing (which implies one-in, to multiple-out or multiple-in to one-out) will not be discussed; however, it is obvious that the solution discussed would suffice for those conditions.

The three-stage matrix represents a means of unlimited connectability between any input and any output port. It allows the simultaneous connection of every input port to any output port. Multiple stage matrices having higher odd numbered stages are covered and in practice are usually capable of multiple three-stage solutions for any three successive stages. Usually at least each middle-substage will be subject to the three-stage solution. That is, in all solutions made to date, a five-stage matrix has been treated as nothing other than a three-stage solution with the middle substage having a three-stage solution for each substage. If in practice any three-stages are covered, and solvable, then that matrix which has any odd number of stages above three is also covered and solvable.

ONE STAGE AS A STANDARD OF COMPARISON

For the sake of simplicity, we will consider a one stage matrix having an equal number of input ports and output ports. Either number of ports is usually defined as N or some other such designator. The number of nodes represents the number of cross point elements, i.e., not the count of cross points, but the count of actuating elements at each intersection. The number of nodes in a square matrix in $N^2$. The number of ports is the sum of the input and output ports and is therefore 2N. If time division multiplexing techniques are used, the frame speed is proportional to N.

CLOS'S CONFIGURATION

The Clos configuration, defined in his above-cited original aticle of 1953, subdivides the matrix equipment into three (3) matrix stages. Then, further, each stage is subdivided, into substages and these substages are interconnected across the stage demarcation lines by "links", such that all substages of the first stage are connected to all substages of the second stage. Similarly, all substages of the middle stage are connected to all substages of the third stage. A Clos configuration utilizes square substages in the middle stage, and rectangular substages in the first and third stages. The quantity of first stage, substages (hereafter called "first substages") times the number of inputs per substage (n) is equal to the total number of input ports (N). Clos proves that if there are (2n−1) mid-substages, and therefore (2n−1) exits from first substages, that the matrix is nonblocked. Note that his solution creates links and, therefore, paths between stages that are almost double what is required between input and output ports. The advantage of the Clos solution over the single stage matrix, is obvious when nodes are counted. In fact, the larger the number of input ports, the greater the advantage. When port connection equipment is counted, however, the amount of external port equipment is equal to the single stage, but the interstage port equipment is larger than the minimum solution (to be described), and the frame speed is proportional to the larger number, which is larger than the minimum equivalent solution would be.

OTHER SQUARE CONFIGURATIONS

M. C. Paull, in his U.S. Pat. No. 3,129,407 "Switching Network Control System", dated Apr. 14, 1964, describes a square set based on equal size substages in first, middle, and last, based on $N=n^2$ and n by n in each substage. It should be noted that this square array is not the same configuration as the minimum configurations of the present invention and, while describing rearrangeability, only claims and describes a method for the non-closed set case. Even then the rearrangeability is based on break before make. The alternate for the blocked condition is another mid-stage (claim 14) called an auxillary switch, to make up for the missing connectability. Various papers have shown the auxiallary switch method to also be blockable and not an absolute solution. The additional M stage must also be supported by additional equipment in the F and L stages, which is not included in the discription or the claims. A comparison of the basic Paull configuration and the minimum configuration is provided hereafter.

OTHER CONFIGURATIONS

Others, including Benes, Slepian-Duguid (no published paper has been found, but many references to their unpublished results exist) and Nakamura have analyzed the Clos shape, or configuration, with various reduced rectangular first and third stages. They have shown that with random path requirements, it is sometimes possible to achieve a condition in which a desired path cannot be made. They then proved for various sizes that the rectangular solution, with less total paths than Clos', can be rearranged by making alternate paths for existing paths and, thereby, allowing a new path to be made utilizing the freed links. In general, these have been done with substages slightly less than the $(2n-1)$ size, but in no case has anyone reduced the input (first) and output (last) substages to squares. As discussed above in the minimum configuration, a condition is reached in which a "closed-set" of paths that are totally blocking can be reached in the limit of the square substages, that do not allow rearrangeability. This statement was not proven in any of the articles, and the proof that the Clos configuration cannot have a closed-set was also not analyzed but the proof that it is non-blocked can be demonstrated.

MINIMUM CONFIGURATION

The minimum configuration is obtained by utilizing square substages in all three stages for the $m=n$ case. Then, if the n and x are chosen in accordance with the calculated minimum total number of nodes, examples of which are provided hereafter, we find that the minimum configuration is of the order of 50% of Clos'. It is important to remember that since the whole numbers are used, alternate solutions may lead to different percentages. Note further that the number of input and output ports is identical to the single stage and, therefore, to Clos. However, the number of interstage ports is identical, at each demarcation line, to the number of input or output ports. The number of interstage ports is approximately 50% of the Clos configuration and this comparison is independent of the n and x values. Note also that the individual substages are smaller than the comparable Clos sizes, and this reduces the speed requirement if time division multiplex methods were to be used.

As was pointed out, now that the minimum configuration of square matrices has been formed and sized by using an n and x based on minimum total number of nodes, the array can have within it a closed set of paths that are unmoveable due to internal blockages within the closed set itself. This means that rearrangeability is not a solution to this blockage problem. Rather than abandon the minimum configuration advantages, a solution which adds some number of nodes to the system in the mid-substages was found. These Mid Stage Links (MSL) allow the connection from any mid-substage to any other mid-substage. After a connection, the MSL between the second substage around through all the others back to the first substage, are still available. Note further that since an unequal pattern of links exists when the MSL is first used that, barring any other need for the remaining MSL links, the disjoint set of links in the system require only the remaining MSL links to complete an entire 100% path requirement.

A clarification should possibly be made on this 100% path requirement, which is the key to the nonblocked matrix solution that has been investigated. There are exactly enough links in the minimum configuration to allow 100% of the paths to be completed. Each substage of the first and last stage has just enough links to provide an exit route for every input or output, respectively. Clos's solution configuration provides alternates to ensure a mid-substage availability with links to both first and last stages of input and output required. The excessive equipment required for the Clos solution has been variously reduced by others by allowing rearrangeability. The problem with rearrangeability is whether it is within the type of equipment provided to ensure that a New Alternate Path (NAP) has been found before an Old Blocking Path (OBP) has been opened. Any solution that opens the OBP before making the NAP, in order to provide an alternate path for another blocking path, is considered to have failed to meet the nonblocked criteria because some path is broken in order to make a new connection. Therefore, if a method, in a time-shared matrix, can be found to interchange two connections during the off-time for both ports, then no apparent breakage occurs and the rearrangeability solution might not even require the MSL for temporary or permanent solution to a path selection problem. In the case of a fundamental (D.C.) mode operation, however, the interchanging of links between two old paths would be considered an interruption and, therefore, MSL is absolutely required as a temporary or permanent connection to achieve 100% connectability.

MINIMUM NODAL CALCULATION

Assume equal inputs and outputs$=N$. For the minimum configuration we have square first-substages and last-substages, as well as mid-substages. Define x as the number of first sub-stages. We then define n as the number of mid-substages and, therefore, the size of the square first (and last) substage. (In the actual control problem and other diagrams, this nomenclature [n and x] does not hold. This use of n is to ensure correspondence to Clos' calculation only.)

$$N=nx \tag{1}$$

The number of nodes in a first-substage is then $=n^2$. The total number of nodes then, in the first stage, is $=x(n^2)$. The number of nodes in the mid-substages are $x^2$.

The number of nodes in the mid-stage is then equal to $n(x^2)$.

The total number of nodes in the matrix, with the first and last substages being equal is:

$$Q = 2xn^2 + xn^2 \quad (2)$$

Substituting equation (1) and clearing to a single variable, then differentiating with respect to that variable $$Q = 2Nn + Nx = 2N^2/x + Nx \quad (3)$$

$$dQ/dx = -2N^2/x^2 + N \quad (4)$$

Setting equation (4) to zero, and verifying that it is a minimum, yields $$x = \sqrt{2N} \quad (5)$$

In a similar manner or, by substitution $$n = \sqrt{N/2} \quad (6)$$

This yields a shape which, for the minimum configuration of square first and last-substages, claims that the least number of nodes occurs when few large substages are used at the mid-stage and many smaller substages are used in first and last stage.

The Clos minimization cannot be calculated by simply substituting $2n-1$ for x, since the shape and count of nodes in the basic equation is different. However, after all the corrections and approximations for N being very large, the value of n for the most efficient size of Clos' is the same as equation (6). The difference in the quantity of nodes for a given size can be shown by comparing the quantity of nodes based on the size (N) of the matrix.

$$\text{Minimum Configuration: } Q = (2N)^{3/2} \quad (7)$$

$$\text{Clos: } Q = 6(N)^{3/2} - 3N \quad (8)$$

Since it is difficult to compare these two equations, the following table may help to show the comparison:

| N | SQ. | CLOS | MIN. | Added by + MSL |
|---|---|---|---|---|
| 100 | 10,000 | 5,700 | 2,828 | 208 |
| 200 | 40,000 | 16,371 | 8,000 | 410 |
| 500 | 250,000 | 65,582 | 31,623 | 1016 |
| 1,000 | 1,000,000 | 136,737 | 89,443 | 2023 |
| 2,000 | 4,000,000 | 536,656 | 252,982 | 4032 |
| 5,000 | 25,000,000 | 2,106,320 | 1,000,000 | 10,050 |
| 10,000 | 100,000,000 | 5,970,000 | 2,828,427 | 20,071 |

The number of MSL nodes required is $n(2x+1)$. It should be noted that the addition to the minimum of this number of nodes to facilitate the MSL is small in comparison to the size that would be required for a Clos' configuration.

A comparison of the Paull square configuration which is based on $N = n^2$ yields a total node count of Paull: $Q = (3) N^{3/2}$ which is larger than $(2N)^{3/2}$ by approximately 5 to 6% of the nodes required. Even after MSL is added to the min. configuration the min. configuration is still approximately 3.6% to 5% less nodes, and covers the blocked traffic condition as well.

I claim:

1. In a switching system having N inputs and M outputs, a three stage matrix array wherein each input may be connected to each output not busy, and every input may simultaneously reach an output, comprising
    a first stage including n square substage matrices, each with x inputs and outputs, where $N = nx$
    a second stage including x substage matrices, each with n inputs and m outputs, an output from each first substage matrix being connected to an input of each second substage matrix,
    a third stage including m square matrices, each with x inputs and outputs where $M = mx$, an output from each second substage matrix being connected to an input of each third substage, and
    switch means for interconnecting the combinations of inputs and outputs of each substage matrix.

2. The matrix of claim 1 in which $M = N$ so that the second stage substage matrices are also square.

3. The matrix of claim 1 or 2 in which each matrix consists of a plurality of conductors extending from the respective inputs and outputs having a node for each input and output conductor crossover points and switch means at each node.

4. The matrix of claim 1 or 2 in which the switch means consists of transfer bus matrices.

5. The matrix switching system of claim 1 or 2 in which the connections between stages are hard wired and not subject to change.

6. The matrix switching system of claim 1 or 2 in which the connection between each input and output consists of a plurality of conductors with the switch means at each node providing a switch for each conductor.

7. The matrix switching system of claim 1 or 2 in which the connection between each input and output consists of a plurality of transfer buses.

8. The matrix switching system of claim 1 or 2 in which each switch means is remotely controlled.

9. The matrix switching system of claim 1 or 2 in which the inputs to the first stage and the outputs from the third stage include cable connectors enabling simultaneous connection of the plurality of conductors.

10. The matrix switching system of claim 1 in which an intrastage link is provided in one stage enabling an output from one substage matrix to be connected to an input of another substage matrix of the same stage.

11. The matrix switching system of claim 2 in which an intrastage link is provided in one stage enabling an output from one substage matrix to be connected to an input of another substage matrix of the same stage.

12. The matrix switching system of claim 10 in which each substage matrix in the stage having the intrastage link is provided with an extra input and an extra output and extra switch means whereby any input can be connected to the intrastage link output and any output can be connected to the intrastage link input.

13. The matrix switching system of claim 11 in which each substage matrix in the stage having the intrastage link is provided with an extra input and an extra output and extra switch means whereby any input can be connected to the intrastage link output and any output can be connected to the intrastage link input.

14. The matrix switching system of either of claims 10 or 12 in which the intrastage link is applied to the middle stage of a three stage matrix and wherein every substage matrix is connected to another midstage substage matrix by an intrastage link, the links from the input and the output in every case going to a different midstage matrix.

15. The matrix switching of either of claims 11 or 13 in which the intrastage link is applied to the middle stage of a three stage matrix and wherein every substage matrix is connected to another midstage substage matrix by an intrastage link, the links from the input and output in every case going to a different midstage matrix in which the midstage matrices are connected in a closed loop by their midstage links.

16. The matrix switching system of either of claims 10 or 12 in which an intrastage link from an output of one matrix is switchable to the input of various matrices of the same stage.

17. The matrix switching system of either of claims 11 or 13 in which an intrastage link from an output of every substage matrix is switchable to an input of every other substage matrix in that stage whereby an input in one substage matrix is connectable to an output in another substage matrix of the same stage.

* * * * *

UNITED STATES PATENT AND TRADEMARK OFFICE
CERTIFICATE OF CORRECTION

PATENT NO. : 4,394,541
DATED : July 19, 1983
INVENTOR(S) : Lewis J. Seiden

It is certified that error appears in the above-identified patent and that said Letters Patent is hereby corrected as shown below:

Column 13, line 6, in formula (2) change the term "$xn^2$" (second occurrence) to --$nx^2$-- so that the formula reads --$Q = 2xn^2 + nx^2$--.

Column 14, line 37, change "buses" to --bus matrices--.

Signed and Sealed this

Fifth Day of March 1985

[SEAL]

Attest:

DONALD J. QUIGG

Attesting Officer

Acting Commissioner of Patents and Trademarks